(12) United States Patent
Kubota

(10) Patent No.: US 7,933,995 B2
(45) Date of Patent: Apr. 26, 2011

(54) COMPUTER PROGRAM AND APPARATUS FOR CONTROLLING COMPUTING RESOURCES, AND DISTRIBUTED PROCESSING SYSTEM

(75) Inventor: Atsushi Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 183 days.

(21) Appl. No.: 11/898,775

(22) Filed: Sep. 14, 2007

(65) Prior Publication Data

US 2008/0133741 A1 Jun. 5, 2008

(30) Foreign Application Priority Data

Dec. 1, 2006 (JP) ................................ 2006-325494

(51) Int. Cl.
*G06F 15/173* (2006.01)

(52) U.S. Cl. ........ 709/226; 709/200; 709/220; 709/224; 380/28

(58) Field of Classification Search ............... 709/201, 709/220–224, 226, 200; 380/28
See application file for complete search history.

(56) References Cited

U.S. PATENT DOCUMENTS

| 2003/0069924 | A1* | 4/2003 | Peart et al. | 709/203 |
|---|---|---|---|---|
| 2005/0131982 | A1* | 6/2005 | Yamasaki et al. | 709/200 |
| 2006/0161893 | A1* | 7/2006 | Han et al. | 709/203 |
| 2009/0225981 | A1* | 9/2009 | Motohashi | 709/203 |

FOREIGN PATENT DOCUMENTS

| JP | 10-074159 A | 3/1998 |
|---|---|---|
| JP | 2004-287889 A | 10/2004 |

OTHER PUBLICATIONS

Patent Abstracts of Japan: Publication No. 2005-056201, Date of Publication Mar. 3, 2005.
"Japanese Office Action", mailed by JPO and corresponding to Japanese application No. 2006-325494 on May 11, 2010, with Partial English translation.

* cited by examiner

*Primary Examiner* — Tammy T Nguyen
(74) *Attorney, Agent, or Firm* — Fujitsu Patent Center

(57) ABSTRACT

A computing program and apparatus for controlling computing resources, and a distributed processing system, which realize determining a computing node to be allocated to a computing task, with taking a time required for changing the state of running software into consideration. A node information acquisition unit continuously acquires and stores environment information indicating running software from computing nodes in a node information memory. A request acceptor accepts a computing request including environment condition information specifying software necessary for execution of a computing task. A node selector compares the environment information of each computing node with the environment condition information to preferentially select a computing node that requires the least software to start, as a commuting node to be allocated. A node controller controls the selected computing node to start the necessary software and then execute the computing task.

7 Claims, 16 Drawing Sheets

| CONFIGURATION INFORMATION TABLE | | | |
|---|---|---|---|
| NODE NAME | IP ADDRESS | CPU | RAM |
| Node1 | 192.168.10.1 | CPU-V3 1.0GHz | 1.0GB |
| Node2 | 192.168.10.2 | CPU-V3 1.5GHz | 2.0GB |
| Node3 | 192.168.10.3 | CPU-V3 3.2GHz | 4.0GB |
| Node4 | 192.168.10.4 | CPU-V4 2.5GHz | 2.0GB |
| Node5 | 192.168.10.5 | CPU-V4 3.2GHz | 4.0GB |

FIG. 6

| ENVIRONMENT INFORMATION TABLE | | | | |
|---|---|---|---|---|
| NODE NAME | OS | APPLICATION SOFTWARE | LIBRARY | CHANGED TIME |
| Node1 | OS-W V10 | VIDEO COMMUNICATION | IMAGE ANALYSIS | 11/3/2006 10:11 |
| Node2 | OS-W V12 | MESSAGE COMMUNICATION | | 11/3/2006 13:15 |
| Node3 | OS-L V5.0 | | | 11/3/2006 12:53 |
| Node4 | OS-W V12 | Web CLIENT | LANGUAGE ANALYSIS | 11/3/200611:47 |
| Node5 | OS-L V6.0 | | STATISTICAL PROCESS | 11/3/2006 15:39 |

| JOB INFORMATION TABLE | | | |
|---|---|---|---|
| NODE NAME | PROGRAM NAME | IMPORTANCE LEVEL | START TIME |
| Node1 | classification.exe | 3 | 11/3/2006 10:11 |
| Node2 | | | |
| Node3 | accounting.out | 5 | 11/3/2006 13:24 |
| Node4 | ranking.exe | 2 | 11/3/2006 15:11 |
| Node5 | | | |

COMPUTER PROGRAM AND APPARATUS FOR CONTROLLING COMPUTING RESOURCES, AND DISTRIBUTED PROCESSING SYSTEM

CROSS-REFERENCE TO RELATED APPLICATIONS

This application is based upon and claims the benefits of priority from the prior Japanese Patent Application No. 2006-325494 filed on Dec. 1, 2006, the entire contents of which are incorporated herein by reference.

BACKGROUND OF THE INVENTION (1) Field of the Invention

This invention relates to a computer program and apparatus for controlling computing resources, and a distributed processing system, and more particularly to a computer program and apparatus for controlling computing resources, and a distributed processing system, for assigning and distributing computing tasks to a plurality of computing nodes.

(2) Description of the Related Art

With recent development of hardware technology, higher-performance and more cost-effective computers come up one after another. Especially, small and medium computers such as desktop personal computers (PC) have noticeable improvement in processing performance per unit cost. Therefore, a distributed processing system that realizes comparable processing performance to a large-scale computer is built by connecting a large number of inexpensive computers over a network. A distributed processing system comprising computers having different computing resources is called a computer grid.

Such a distributed processing system can be built at a low cost, as compared with a large-scale computer. In addition, it is easy to enhance the processing performance according to necessity after the system is built. In the distributed processing system, hardware resources that can perform computing tasks independently are each called a computing node in the following description.

By the way, in order to maximize the execution efficiency of computing tasks in the distributed processing system, what is important is how to schedule the computing tasks, that is, to determine which computing tasks are assigned to which computing nodes. At this point, in a conventional distributed processing system, a system administrator or a user checks the execution state of a computing task on each computing node, and manually reserves computing nodes in advance. However, there arise problems that this manual reservation is a complicated work and may not always lead to the maximized execution efficiency.

There is a known technique in which a management computer is provided to manage computing nodes and is designed to automatically determine which computing node is to be allocated to a new computing task. In the technique disclosed in Japanese Unexamined Patent Publication No. 2005-174201, for example, a management computer detects the operating state of each computing node and assigns a new computing task to a computing node having a low load. In addition, with the technique disclosed in Japanese Unexamined Patent Publication No. 2005-56201, a computing node to be allocated to a new computing task is determined with taking the predicted execution time and priority of the computing task into consideration. These make it possible to easily enhance the execution efficiency of computing tasks by the best use of the processing performance of the distributed processing system.

However, in these techniques disclosed in the above Japanese Unexamined Patent Publication Nos. 2005-174201 and 2005-56201, preparations that should be done before start of a computing task are not considered. This causes an improper order of assignment of computing tasks, and therefore a considerable time may be taken for preparations, with the result that the execution efficiency deteriorates.

The preparations are a process of changing the state of running software in a computing node. Each computing task requires some software (operating system (OS), application software, library, and so on) for execution. If software necessary for a computing task does not run, the computing node should make preparations of starting the necessary software. On the other hand, if all software necessary for the computing task is running, the preparations are not required.

In order to improve the execution efficiency of computing tasks, what is important is to take software running on each computing node into consideration. This consideration is very critical in the case where software that cannot run at the same time exist. For example, in general, only one OS can run on one computing node. Therefore, if an OS different from a running OS is required, the computing node should stop the running OS first. Suppose now that there are computing tasks A and C that require OS-1 and computing tasks B and D that require OS-2. If a computing node executes the computing tasks A, B, C, and D in order, the computing node should switches between the OSs every time the computing tasks are executed, which remarkably deteriorates the execution efficiency.

SUMMARY OF THE INVENTION

This invention was made in view of the foregoing and intends to provide a computer program and apparatus for managing computing resources and a distributed processing system, for determining a computing node to be allocated to a computing task with taking a time required for changing the state of running software into consideration.

To accomplish the above object, this invention intends to propose a computer-readable recording medium containing a computer resource management program for assigning and distributing a computing task to a plurality of computing nodes. The contained computer resource management program causes a computer to perform as: a node information memory storing environment information indicating running software on each of the plurality of computing nodes; a node information acquisition unit for continuously acquiring the environment information from the plurality of computing nodes and storing the environment information in the node information memory; a request acceptor for receiving a computing request including environment condition information specifying necessary software for execution of the computing task; a node selector for comparing the updated environment information of each of the plurality of computing nodes, which is stored in the node information memory, with the environment condition information and preferentially selecting from among the plurality of computing nodes a computing node that requires the least software to start with a start process as a computing node to be allocated when the request acceptor receives the computing request; and a node controller for controlling the computing node selected by the node selector to perform the start process of not-running software if there is the not-running software out of the necessary software specified in the environment condition information and then to execute the computing task according to the computing request.

Further, to accomplish the above object, this invention proposes a distributed processing system for assigning and distributing a computing task to a plurality of computing nodes. This distributed processing system comprises: the plurality of computing nodes each including a start file memory storing a start file describing information to be used in a start process of software, a computing unit for starting not-running software specified, by using the start file stored in the start file memory in accordance with an instruction of the start process and starting the computing task in accordance with an instruction of the computing task, and a state monitoring unit for continuously monitoring the computing unit to collect environment information indicating running software; a business computer including a request issuance unit for issuing a computing request at prescribed timing, the computing request including environment condition information specifying necessary software for execution of the computing task; and a management computer including a node information memory storing the environment information indicating the software running on each of the plurality of computing nodes, a node information acquisition unit for continuously acquiring the environment information from the plurality of computing nodes and storing the environment information in the node information memory, a request acceptor for receiving the computing request issued from the business computer, a node selector for comparing the updated environment information of each of the plurality of computing nodes, which is stored in the node information memory, with the environment condition information and preferentially selecting from among the plurality of computing nodes a computing node that requires the least software to start with a start process as a computing node to be allocated when the request acceptor receives the computing request, and a node controller for controlling the computing node selected by the node selector to perform the start process of not-running software if there is the not-running software out of the necessary software specified in the environment condition information and then to execute the computing task according to the computing request.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 6 shows an example data structure of a configuration information table.

FIG. 7 shows an example data structure of an environment information table.

FIG. 8 shows an example data structure of a job information table.

DESCRIPTION OF THE PREFERRED EMBODIMENTS

A preferred embodiment of this invention will be described with reference to the accompanying drawings. The embodiment will be first outlined and then described in detail.

Figure 1:
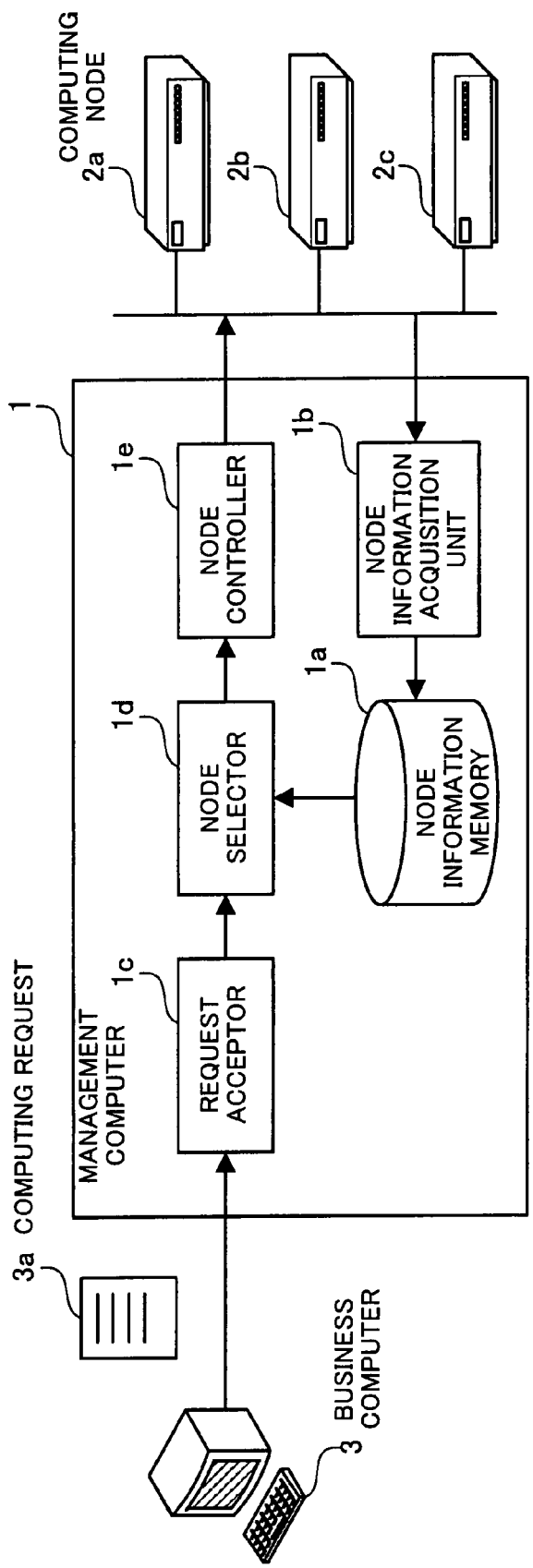
FIG. 1 shows an outline of one embodiment.

FIG. 1 shows an outline of the embodiment. A management computer 1 shown in FIG. 1 accepts a computing request 3$a$ issued from a business computer 3, and assigns and distributes a computing task to a plurality of computing nodes 2$a$, 2$b$, and 2$c$. The management computer 1 has a node information memory 1$a$, a node information acquisition unit 1$b$, a request acceptor 1$c$, a node selector 1$d$, and a node controller 1$e$.

The node information memory 1$a$ stores environment information of the computing nodes 2$a$, 2$b$, and 2$c$. The environment information is information showing software running on each computing node. For example, the environment information includes the names of a running OS, application software, and library. When software is running, it means that its program and so on are put on a main memory and are always ready to be used.

The node information acquisition unit 1$b$ continuously acquires environment information from the computing nodes 2$a$, 2$b$, and 2$c$. There are two methods for acquiring environment information. One is that the node information acquisition unit 1$b$ actively accesses the computing nodes 2$a$, 2$b$, and 2$c$ to acquire environment information. The other is that the node information acquisition unit 1$b$ passively waits the computing nodes 2$a$, 2$b$, and 2$c$ to output environment information. Then the node information acquisition unit 1$b$ stores the acquired environment information in the node information memory 1$a$.

When the business computer 3 issues the computing request 3$a$, the request acceptor 1$c$ receives the issued computing request 3$a$. The computing request 3$a$ includes environment condition information specifying software necessary for execution of a computing task.

When the request acceptor 1$c$ receives the computing request 3$a$, the node selector 1$d$ consults the environment information stored in the node information memory 1$a$ to select a computing node to be requested to execute the computing task according to the computing request 3$a$. Specifically, the node selector 1$d$ compares the updated environment information of the computing nodes 2$a$, 2$b$, and 2$c$ with the environment condition information included in the computing request 3$a$. Then the node selector 1$d$ preferentially selects a computing node that requires the least software to start with a start process.

The node controller 1$e$ controls the computing node selected by the node selector 1$d$ to start the computing task according to the computing request 3$a$. Specifically, if some of software specified in the environment condition information do not run, the node controller 1$e$ first causes the computing node to perform a start process to start the software. When the start process is completed, the node controller 1$e$ causes the computing node to start the computing task according to the computing request 3$a$.

With such the management computer 1, the node information acquisition unit 1$b$ continuously acquires environment information showing running software from the computing nodes 2$a$, 2$b$, and 2$c$. The request acceptor 1$c$ accepts the computing request 3$a$ including environment condition information specifying software necessary for execution of a computing task. The node selector 1$d$ compares the updated environment information of the computing nodes 2$a$, 2$b$, and 2$c$ with the environment condition information, and preferentially selects a computing node that requires the least software to start with a start process, as a computing node to be allocated. The node controller 1e controls the selected computing node to perform the start process of not-running software if there is the not-running software out of the software specified in the environment condition information, and then to execute the computing task according to the computing request 3a.

As a result, a time for changing the state of running software can be reduced and the execution efficiency of computing tasks in the computing nodes 2a, 2b, and 2c can be improved. In addition, the substantial use rate of computing nodes 2a, 2b, and 2c can be improved.

Now, the embodiment will be described in detail with reference to the drawings.

Figure 2:
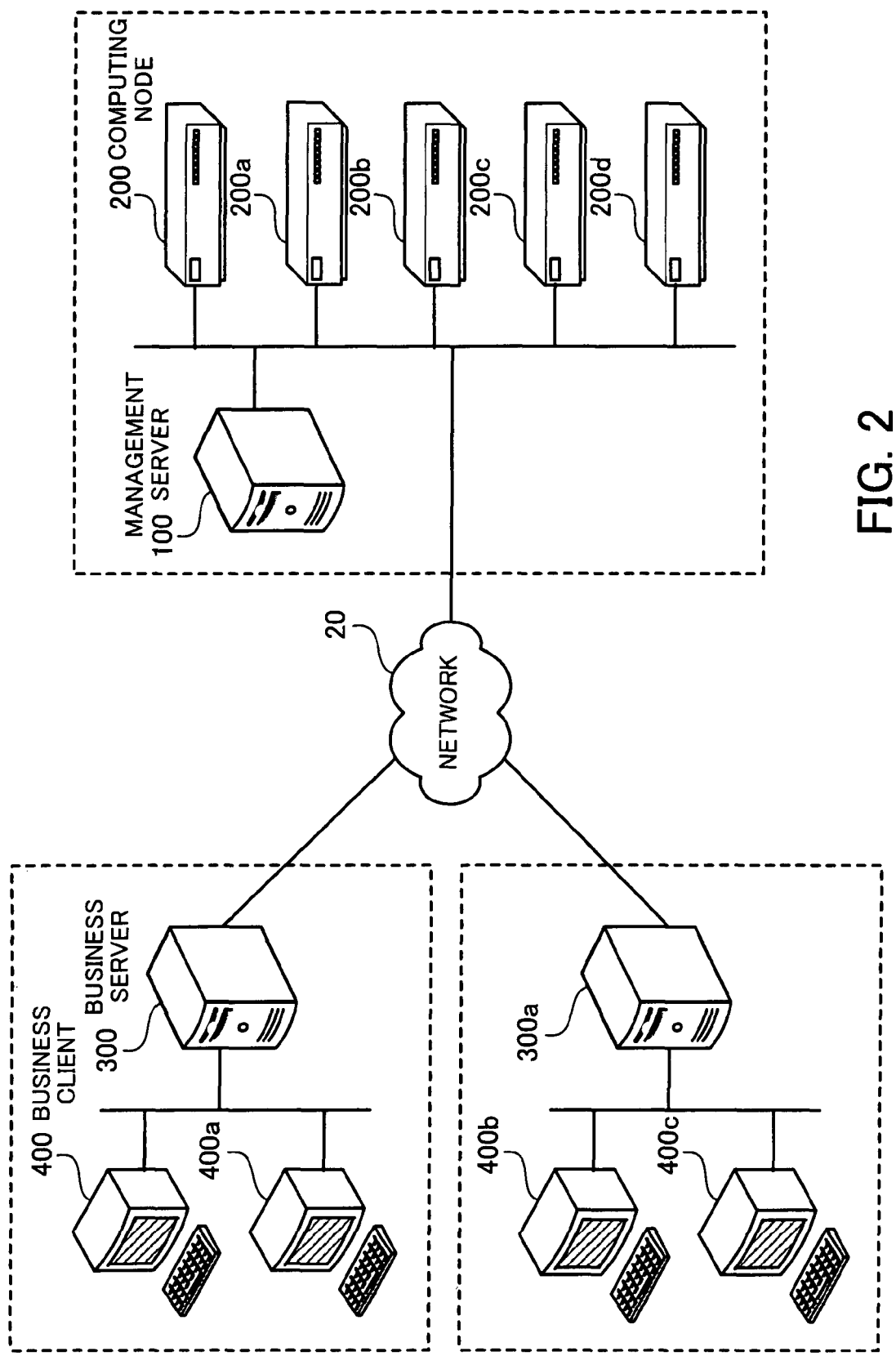
FIG. 2 shows a system configuration according to the embodiment.

FIG. 2 shows a system configuration of this embodiment. In the distributed processing system according to the embodiment, a computer arranged in an organization can access a group of remote computers via a network to request them to execute a job. Therefore, each organization can use computing resources located outside the organization when the need arises, which eliminates a necessity of owing excessive computing resources for large-scale jobs that are intermittently required.

The distributed processing system shown in FIG. 2 comprises a management server 100, computing nodes 200, 200a, 200b, 200c, and 200d, business servers 300 and 300a, business clients 400, 400a, 400b, and 400c, and a network 20. The business server 300 and the business clients 400 and 400a are arranged in one organization. Similarly, the business server 300a and the business clients 400b and 400c are arranged in another organization.

The business servers 300 and 300a can communicate with the management sever 100 and the computing nodes 200, 200a, 200b, 200c, and 200d over the network 20. The management server 100 can communicate with the computing nodes 200, 200a, 200b, 200c, and 200d. The business clients 400 and 400a can communicate with the business server 300. The business clients 400b and 400c can communicate with the business server 300a.

The management server 100 is a computer for managing the computing nodes 200, 200a, 200b, 200c, and 200d. The management server 100 periodically receives operating states from the computing nodes 200, 200a, 200b, 200c and 200d. In addition, when receiving a job request requesting execution of a job from a business server 300, 300a, the management server 100 selects a computing node to be allocated to the job, with taking the operating states of the computing nodes into consideration.

The computing nodes 200, 200a, 200b, 200c, and 200d are computers for executing requested jobs. The computing nodes 200, 200a, 200b, 200c, and 200d change the states of running software such as OS, application software, and library according to necessity. In addition, the computing nodes 200, 200a, 200b, 200c and 200d periodically report their operating states to the management server 100.

The business servers 300 and 300a are computers that are used for daily work in corresponding organizations. If a large-scale job that is intermittently required is actually required to be executed, the business server 300, 300a sends a job request to the management server 100 at proper timing. The large-scale job to be intermittently required is a monthly accounting process, for example. The business server 300, 300a puts programs and input data on a computing node allocated by the management server 100 to execute the job. When the job is completed, the business server 300, 300a obtains output data from the computing node.

The business clients 400, 400a, 400b, and 400c are computers that workers of corresponding organizations use in daily work. The business clients 400 and 400a access the business server 300 according to operation commands from workers to refer to and update data in the business server 300. Similarly, the business clients 400b and 400c access the business server 300a according to operation commands from workers to refer to and update data stored in the business server 300a.

Now, the hardware configurations of the management server 100, the computing nodes 200, 200a, 200b, 200c, and 200d, the business server 300, and the business clients 400, 400a, 400b, and 40c will be described.

Figure 3:
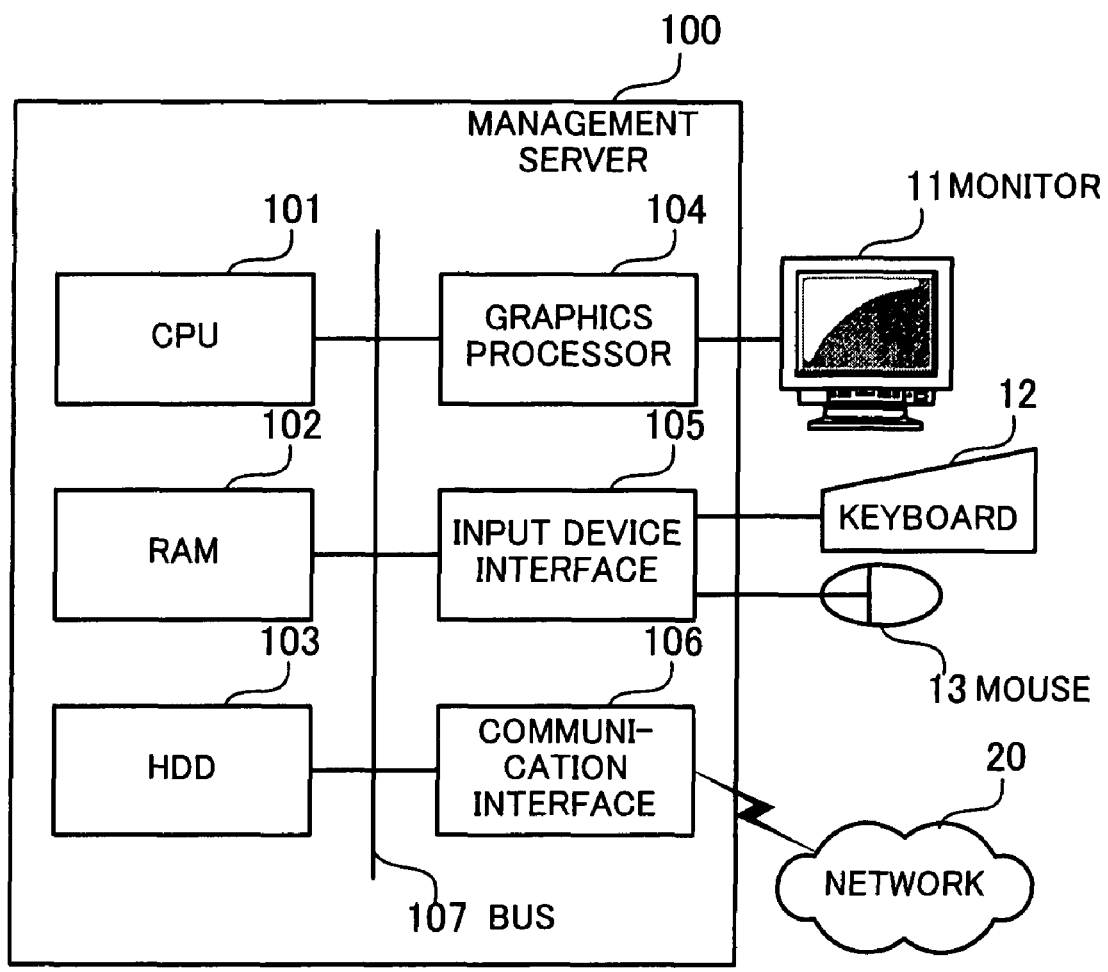
FIG. 3 shows a hardware configuration of a management server.

FIG. 3 shows a hardware configuration of a management server. The management server 100 is entirely controlled by a central processing unit (CPU) 101. Connected to the CPU 101 via a bus 107 are a random access memory (RAM) 102, a hard disk drive (HDD) 103, a graphics processor 104, an input device interface 105, and a communication interface 106.

The RAM 102 temporally stores part of an OS program and application programs to be executed by the CPU 101. In addition, the RAM 102 stores various data necessary for CPU processing. The HDD 103 stores the OS program and application programs.

The graphics processor 104 is connected to a monitor 11 and is designed to display images on a screen of the monitor 11 under the control of the CPU 101. The input device interface 105 is connected to a keyboard 12 and a mouse 13. The input device interface 105 transfers signals from the keyboard 12 and the mouse 13 to the CPU 101 via the bus 107. The communication interface 106 is connected to the network 20.

The computing nodes 200, 200a, 200b, 200c and 200d, the business server 300, and the business clients 400, 400a, 400b, and 400c have the identical hardware configuration to the management server 100. In this connection, it should be noted that the business clients 400, 400a, 400b, and 400c are not connected to the network 20.

The processing functions of the embodiment can be realized with the above hardware configuration.

Now, the module structures of the management server 100 and the computing nodes 200, 200a, 200b, 200c, and 200d will be described.

Figure 4:
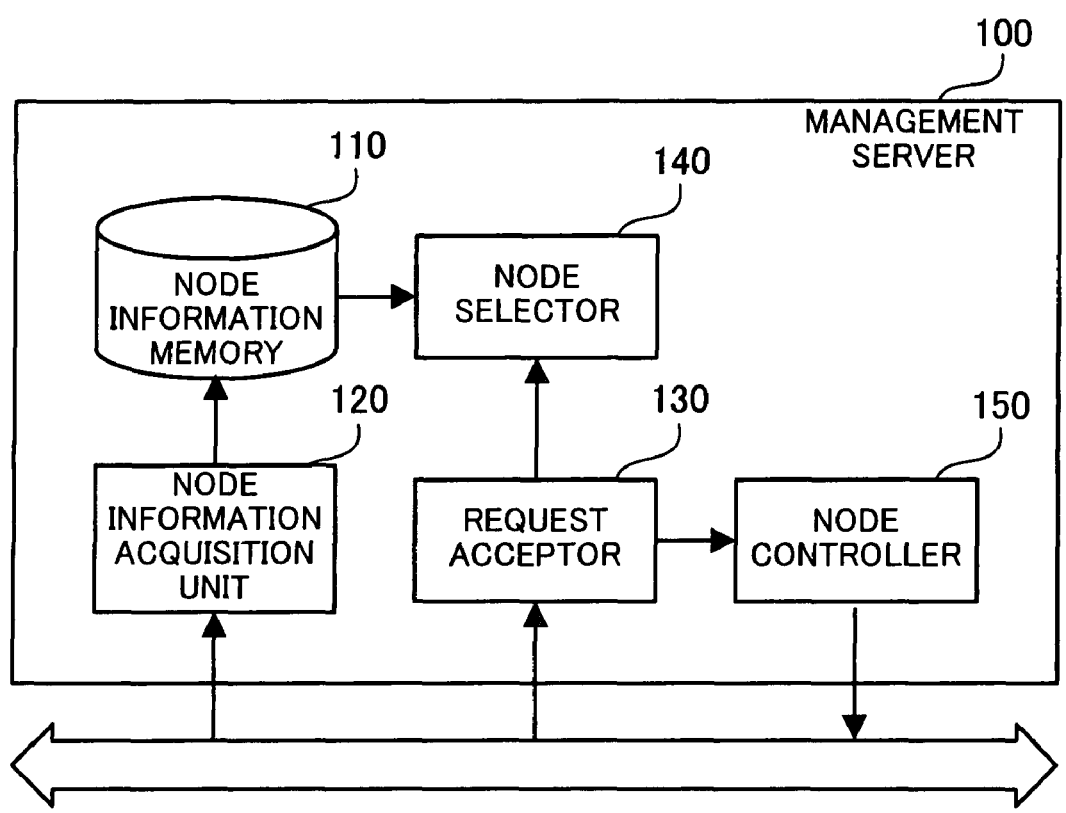
FIG. 4 is a functional block diagram of the management server.

FIG. 4 is a functional block diagram of a management server. The management server 100 has a node information memory 110, a node information acquisition unit 120, a request acceptor 130, a node selector 140, and a node controller 150. The node information acquisition unit 120 and the node controller 150 can communicate with the computing nodes 200, 200a, 200b, 200c, and 200d. The request acceptor 130 can communicate with the business servers 300 and 300a over the network 20.

The node information memory 110 stores node information indicating the operating states of the computing nodes 200, 200a 200b, 200c, and 200d. The node information is made up of configuration information showing a hardware configuration, environment information showing the state of running software, and job information indicating the execution state of a job.

The node information acquisition unit 120 receives configuration information, environment information, and job information from the computing nodes 200, 200a, 200b, 200c, and 200d. Then the node information acquisition unit 120 appropriately updates the node information stored in the node information memory 110 based on the acquired information.

The request acceptor 130 receives a job request from a business server 300, 300a. The job request includes condition information showing conditions for executing a job. In more detail, the condition information is made up of configuration condition information specifying hardware to be required for execution of a job, environment condition information specifying software necessary for the execution of the job, and importance information indicating the importance level of the job.

When receiving a job request, the request acceptor 130 notifies the node selector 140 of the condition information. If the node selector 140 selects a computing node successfully, the request acceptor 130 notifies the node controller 150 of information on the selected computing node and the environment condition information. Then when receiving a response indicating completion of preparations from the node controller 150, the request acceptor 130 notifies the job requester of information on the computing node to be allocated. If the node selector 140 fails to select a computing node, on the contrary, the node selector 140 notifies the job requestor of rejection of the job execution.

Upon reception of the condition information from the request acceptor 130, the node selector 140 consults the node information stored in the node information memory 110 to select a computing node to be allocated to the job. In this connection, a computing node that is not executing a job is preferentially selected as a computing node to be allocated. In addition, a computing node that mostly satisfies the environment conditions is preferentially selected. A method of selecting a computing node will be described in detail later. Then when the node selector 140 can select a computing node successfully, it notifies the request acceptor 130 of information on the selected computing node. When the node selector 140 fails to select a computing node, it notifies the request acceptor 130 of this failure.

It should be noted that a job request may specify the number of necessary computing nodes. In this case, when the node selector 140 can select the requested number of computing nodes, this node selection can be identified as successful. If the node selector 140 fails to select the requested number of computing nodes, this node selection is identified as failed.

When receiving the information on the computing node and the environment condition information from the request acceptor 130, the node controller 150 transmits the environment condition information to the selected computing node. When receiving a preparation completion notification from the computing node, the node controller 150 transfers the preparation completion notification to the request acceptor 130.

Figure 5:
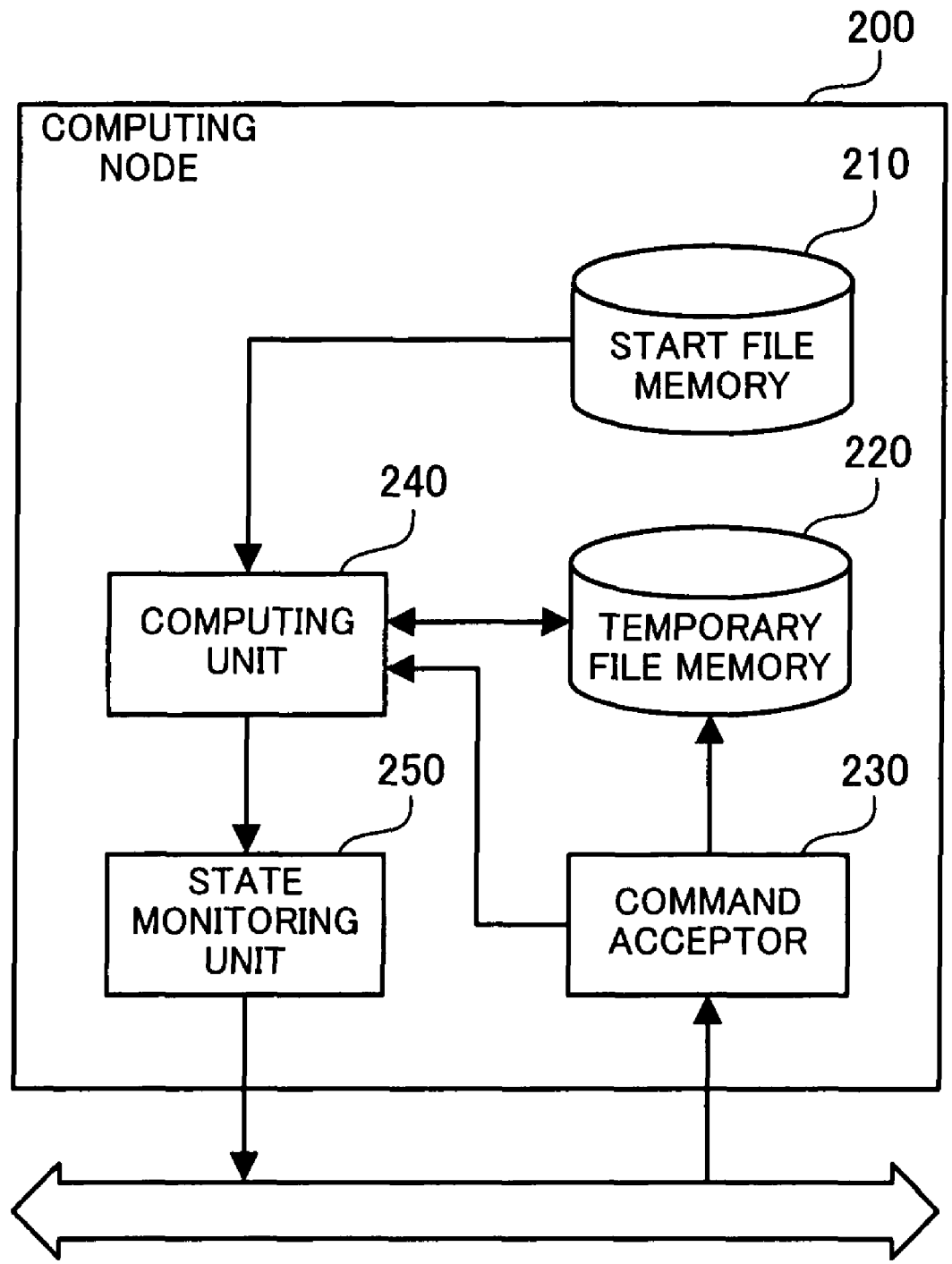
FIG. 5 is a functional block diagram of a computing node.

FIG. 5 is a functional block diagram of a computing node. The computing node 200 has a start file memory 210, a temporary file memory 220, a command acceptor 230, a computing unit 240, and a state monitoring unit 250. The command acceptor 230 and the state monitoring unit 250 can communicate with the management server 100. In addition, the command acceptor 230 can communicate with the business servers 300 and 300*a*.

The start file memory 210 stores start files that are necessary for starting software. The start files include program files for OSs and application software and setting files defining the initial states of software.

The temporary file memory 220 stores user-defined programs and input data that are required for job execution. In addition, the temporary file memory 220 stores intermediate data that the computing unit 240 occasionally outputs in the course of executing a job, and output data to be output as an execution result.

When receiving environment condition information from the management server 100, the command acceptor 230 notifies the computing unit 240 of the received environment condition information. In addition, when receiving user-defined programs and input data from the business server 300, 300*a*, the command acceptor 230 stores the received programs and input data in the temporary file memory 220 and then instructs the computing unit 240 to start a job. In addition, when receiving a request for sending output data from the business server 300, 300*a*, the command acceptor 230 retrieves corresponding output data from the temporary file memory 220 and sends the data to the requesting business server.

When receiving the environment condition information from the command acceptor 230, the computing unit 240 compares the running software with software specified in the environment condition information to specify software that should be started. Then, the computing unit 240 obtains a start file corresponding to the software to be started, from the start file memory 210 and performs a start process of the software. If some of software running should be ended to start the necessary software, the computing unit 240 ends the running software first.

When instructed to start a job from the command acceptor 230, the computing unit 240 obtains relevant programs and input data from the temporary file memory 220, and executes the job. The computing unit 240 occasionally stores intermediate data to be output in the course of the job execution and output data to be output as an execution result, in the temporary file memory 220. In this connection, when instructed to start a new job while the job is being executed, the computing unit 240 saves data regarding the job being executed in the temporary file memory 220, and starts to execute the new job.

When the computing node 200 is powered on, the state monitoring unit 250 first checks the hardware configuration of the computing node 220 and sends the configuration information to the management server 100. In addition, the state monitoring unit 250 continuously monitors the computing unit 240, and periodically sends environment information and job information to the management server 100. For example, the environment information and job information are sent every two minutes.

The computing nodes 200*a*, 200*b*, 200*c*, and 200*d* can be realized by having an identical module structure to the computing node 200.

Now, the data structure of node information to be stored in the node information memory 110 of the management server 100 will be described. The node information memory 110 stores a configuration information table 111, an environment information table 112, and a job information table 113.

FIG. 6 shows a data structure of a configuration information table. The configuration information table 111 contains the configuration information of the computing nodes in tabular form. The configuration information table 111 has node name items 111*a*, Internet Protocol (IP) address items 111*b*, CPU items 111*c*, and RAM items 111*d*. Information arranged in a row is associated with each other and composes configuration information.

A node name item 111*a* is a node name that has been uniquely given to a computing node in advance. An IP address item 111*b* is an IP address that has been assigned to a computing node in advance. A CPU item 111*c* shows the type of a CPU provided on a computing node. If a computing node has a plurality of CPUs, the types of the CPUs are all set by inserting a comma (,) between them. A RAM item 111*d* shows the memory capacity of a RAM provided on a computing node.

The configuration information of the configuration information table 111 is appropriately updated by the node information acquisition unit 120. For example, information indicating a node name of "Node1", an IP address of "192.168.10.1", a CPU type of "CPU-V3 1.0 GHz", and an RAM of "1.0 GB" is stored.

FIG. 7 is an example data structure of an environment information table. The environment information table 112 contains the environment information of the computing nodes in tabular form. The environment information table 112 has node name items 112a, OS items 112b, application software items 112c, library items 112d, and changed time items 112e. Information arranged in a row is associated with each other and composes environment information.

A node name item 112a is the node name of a computing node. An OS item 112b is the name of an OS running on a computing node. An application software item 112c is the name of application software running on a computing node. If a plurality of application software is running on a computing node, their names are all set by inserting a comma between them. A library item 112d is the name of a library running on a computing node. If a plurality of libraries are running on a computing node, their names are all set by inserting a comma between them. A changed time item 112e is a time of when change of the state of running software was completed.

The environment information of the environment information table 112 is appropriately updated by the node information acquisition unit 120. For example, with respect to the computing node 200, information indicating a node name of "Node1", an OS of "OS-W V10", application software of "video communication", a library of "image analysis", and a changed time of "Nov. 3, 2006 10:11" is stored.

As to the changed time, each computing node may detect a change and report the detected time to the node information acquisition unit 120. Alternatively, the node information acquisition unit 120 may detect a change based on information given from a computing node and set the detected time as a changed time.

FIG. 8 is an example data structure of a job information table. The job information table 113 contains the job information of the computing nodes in tabular form. The job information table 113 has node name items 113a, program name items 113b, importance level items 113c, start time items 113d. Information arranged in a row is associated with each other and composes job information.

A node name item 113a is the node name of a computing node. A program name item 113b is the name of a job running on a computing node. If there is no job running, this item 113b is null. An importance level item 113c is a value indicating the importance level of a job being executed on a computing node. A value "5" is the highest importance level while a value "1" is the lowest importance level. If there is no job being executed, this item 113c is null. A start time item 113d is a time of when a job being executed on a computing node was started. If there is no job being executed, this item 113d is null.

The job information of the job information table 113 is appropriately updated by the node information acquisition unit 120. For example, with respect to the computing node 200, information indicating a node name of "Node1", a program name of "classification.exe", an importance level of "3", and a start time of "Nov. 3, 2006 10:11" is stored.

As to the start time, each computing node may detect the start of a job and report the detected time to the node information acquisition unit 120. Alternatively, the node information acquisition unit 120 may detect the start of a job based on information given from a computing node and set the detected time as a start time.

Now, processes to be performed in a system employing the above data structures will be described in detail.

First explanation is about how the computing nodes 200, 200a, 200b', 200c, and 200d collect and send configuration information, environment information, and job information to the management server 100.

Figure 9:
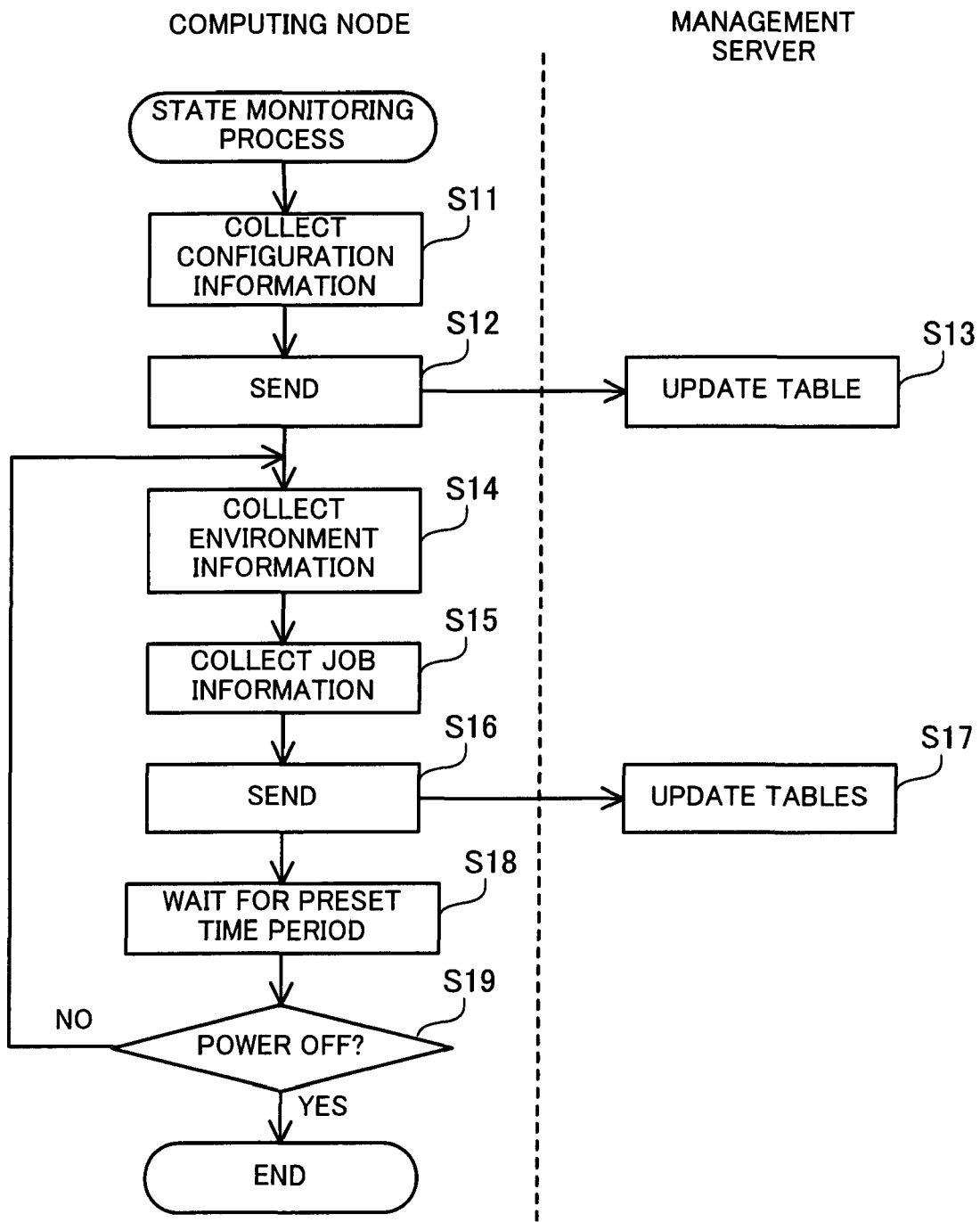
FIG. 9 is a flowchart of a state monitoring process.

FIG. 9 is a flowchart of a state monitoring process. This procedure will be described step by step. A case of the computing node 200 sending information will be explained here and the other computing nodes 200a, 200b, 200c, and 200d perform the state monitoring process in the same way.

At step S11, when the computing node 200 is powered on, the state monitoring unit 250 checks the hardware configuration of the computing node 200 to collect configuration information.

At step S12, the state monitoring unit 250 sends the configuration information collected at step S11, to the node information acquisition unit 120 of the management server 100.

At step S13, the node information acquisition unit 120 updates the configuration information table 111 stored in the node information memory 110 based on the received configuration information.

At step S14, the state monitoring unit 250 checks the state of running software on the computing unit 240 to collect environment information.

At step S15, the state monitoring unit 250 checks the execution state of a job on the computing unit 240 to collect job information.

At step S16, the state monitoring unit 250 sends the environment information collected at step S14 and the job information collected at step S15 to the node information acquisition unit 120 of the management server 100.

At step S17, the node information acquisition unit 120 updates the environment information table 112 stored in the node information memory 110 based on the received environment information. In addition, the node information acquisition unit 120 updates the job information table 113 stored in the node information memory 110 based on the received job information.

At step S18, the state monitoring unit 250 waits for a preset time period.

At step S19, the state monitoring unit 250 determines whether the computing node 200 is to be powered off. When yes, this procedure is completed. When not, the procedure goes back to step S14.

In this way, the state monitoring unit 250 of the computing node 200 sends the configuration information to the node information acquisition unit 120 of the management server 100 when the computing node 200 is powered on. In addition the state monitoring unit 250 monitors the computing unit 240, and periodically sends the environment information and the job information to the node information acquisition unit 120.

Next explanation is about a process in which the business server 300 sends a job request to the management server 100 to cause one or more computing nodes to execute a job.

Figure 10:
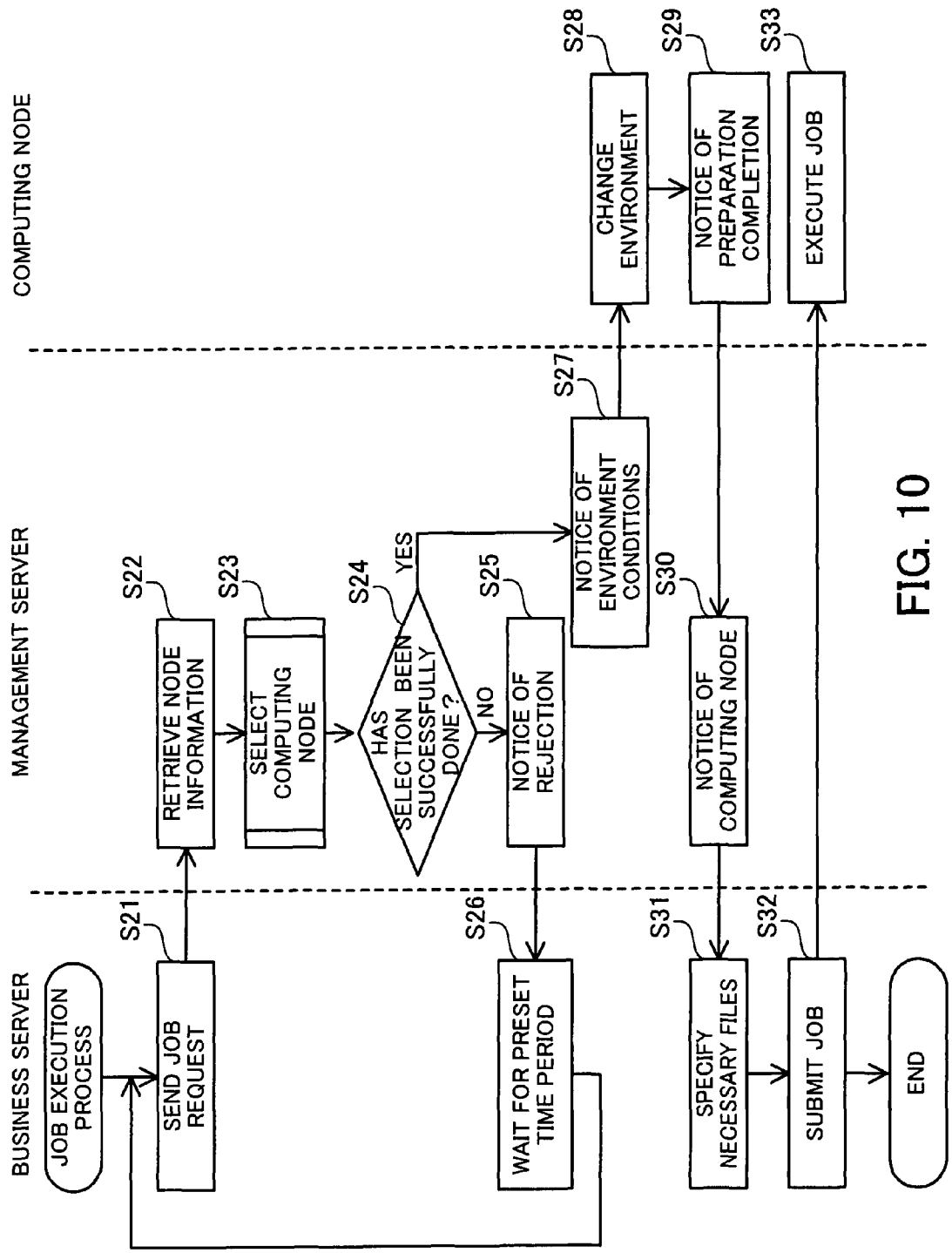
FIG. 10 is a flowchart of a job execution process.

FIG. 10 is a flowchart of a job execution process. This procedure will be described step by step. In this explanation, a case, where the business server 300 sends a job request and a computing node 200 is selected will be explained. The same procedure can be applied to a case where the business server 300a sends a job request and a case where another computing node 200a, 200b, 200c, 200d is selected.

At step S21, the business server 300 specifies configuration conditions, environment conditions and an importance level as to a job to be executed. Then the business server 300 sends a job request including condition information indicating the above specified contents to the request acceptor 130 of the management server 100.

At step S22, the request acceptor 130 notifies the node selector 140 of the condition information included in the received job request. The node selector 140 retrieves the node information of the computing nodes 200, 200a, 200b, 200c, and 200d from the node information memory 110.

At step S23, the node selector 140 compares the condition information received at step S22 with the retrieved node information to select a computing node to be allocated to the job. If the number of necessary computing nodes is specified, the node selector 140 attempts to select the specified number of computing nodes. A method of selecting a computing node will be described in detail later.

At step S24, the node selector 140 determines whether a computing node was selected at step S23 successfully. When yes, this procedure goes on to step S27. When not, the procedure goes on to step S25.

At step S25, the node selector 140 notifies the request acceptor 130 of the selection failure of a computing node. The request acceptor 130 notifies the business server 300 of rejection of the job execution.

At step S26, the business server 300 stops preparing for submitting a job and waits for a preset time period. Then this procedure goes back to step S21.

At step S27, the node selector 140 notifies the request acceptor 130 of the IP addresses of all computing nodes selected at step S23. The request acceptor 130 notifies the node controller 150 of the received IP addresses and the environment condition information included in the condition information obtained at step S22. The node controller 150 sends the environment condition information to the computing nodes identified by the IP addresses (in this example, it is supposed that the computing node 200 was selected at step 23).

At step S28, the command acceptor 230 notifies the computing unit 240 of the received environment condition information. The computing unit 240 compares the current state of running software with the received environment condition information to specify software that should be started. Then the computing unit 240 retrieves corresponding start files from the start file memory 210 and performs the start process of the specified software.

At step S29, when the computing unit 240 completes the start process, the command acceptor 230 sends a preparation completion notification to the node controller 150 of the management server 100.

At step S30, upon reception of the preparation completion notifications from all the computing nodes to which the environment condition information was sent at step S27, the node controller 150 transfers the preparation completion notifications to the request acceptor 130. The request acceptor 130 notifies the business server 300 of a list of the IP addresses received at step S27.

At step S31, the business server 300 receives the list of IP addresses (in this example, it is supposed that the computing node 200 is specified). Then the business server 300 specifies files of programs and input data that are necessary for executing the job.

At step S32, the business server 300 sends the programs and input data specified at step S31 to the command acceptor 230 of the computing node 200. At this time, the business server 300 specifies the importance level of the job as well.

At step S33, the command acceptor 230 stores the received programs and input data in the temporary file memory 220. Then the command acceptor 230 specifies the importance level of the job and instructs the computing unit 240 to start the job.

In this way, the business server 300 first sends a job request to the management server 100. The management server 100 attempts to select a computing node, and notifies the selected computing node of environment conditions when the computing node can be selected successfully or notifies the business server of the selection failure of a computing node when a computing node cannot be selected successfully. The computing node changes the state of running software according to the environment conditions. When the computing node completes preparations, the management server 100 notifies the business server 300 of the computing node to be allocated. The business server 300 requests the allocated computing node to execute the job.

Next explanation is about how to select a computing node at above step S23.

Figure 11:
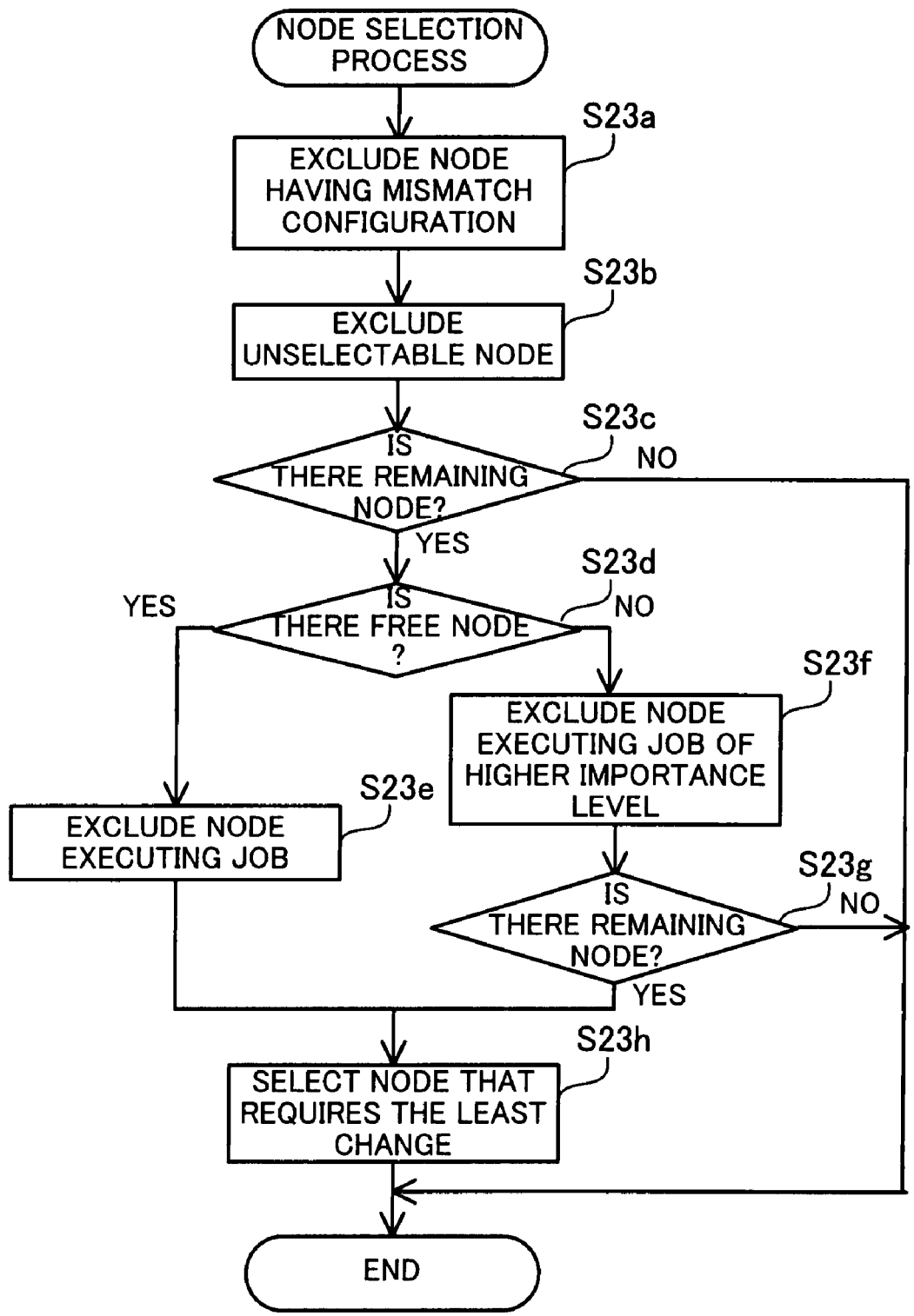
FIG. 11 is a flowchart of a node selection process.

FIG. 11 is a flowchart of a node selection process. This procedure will be described step by step.

At step S23a, the node selector 140 compares the configuration information of each computing node with the configuration condition information that is included in condition information, and excludes computing nodes that do not match the hardware configuration specified in the configuration condition information.

At step S23b, the node selector 140 detects computing nodes that are identified as unselectable under a prescribed rule, based on the environment information and job information of the remaining computing nodes and the environment condition information included in the condition information. Then the node selector 140 excludes the detected computing nodes from selectable nodes. The rule for identifying a computing node as unselectable will be described in detail later.

At step S23c, the node selector 140 determines whether there is one or more computing nodes remaining. When yes, this procedure goes on to step S23d. When not, the node selector 140 determines that the selection of computing nodes was failed, and the procedure is completed.

At step S23d, the node selector 140 refers to the job information of the remaining computing nodes, and determines whether there is a computing node that is not executing a job. When yes, this procedure goes on to step S23e. When not, the procedure goes on to step S23f.

At step S23e, the node selector 140 excludes computing nodes which are executing jobs, from selectable nodes.

At step S23f, the node selector 140 compares the job information of each remaining computing node with the importance level information included in the condition information, and excludes computing nodes which are executing jobs higher in importance level than the job to be executed.

At step S23g, the node selector 140 determines whether there is one or more computing nodes remaining. When yes, this procedure goes on to step S23h. When not, the node selector 140 determines that the selection of computing nodes was failed, and the procedure is completed.

At step S23h, the node selector 140 compares the environment information of each remaining computing node with the environment condition information, and selects a computing node that requires to start the least software out of the software specified in the environment condition information.

In this connection, the determination at step S23h may be done by performing weighting according to software type, not according to the number of software. For example, an OS of which the start process takes a longer time may be weighted.

In summary, the node selector 140 selects computing nodes that have hardware configurations matching specified conditions. Then, the node selector 140 selects computing nodes that are not executing jobs. When all computing nodes are executing jobs, the node selector 140 selects computing nodes that are executing jobs of lower importance levels. Then the node selector 140 selects computing nodes that have the state of running software close to the specified conditions.

For example, suppose now that the computing nodes 200, 200a, 200b, 200c, and 200d have operating states shown in FIGS. 6 to 8. "Node1", "Node2", "Node3", "Node4", and "Node5" represent the computing nodes 200, 200a, 200b, 200c, and 200d, respectively. In addition, suppose that the business server 300 issues a job request specifying that "an RAM should have a capacity of 2.0 GB or more and an OS should be of version after OS-W V10".

In this case, the node selector 140 first selects the computing nodes 200a, 200b, 200c, and 200d, based on the configuration condition of "an RAM should have a capacity of 2.0 GB or more". Then the node selector 140 selects the computing nodes 200a and 200d based on whether there is a job being executed. Then the node selector 140 selects the computing node 200a based on the environment condition specifying that "an OS should be of version after OS-W V10". As a result, the computing node 200a is finally selected as a computing node to be allocated to the job.

Next explanation is about how to detect unselectable computing nodes at above step S23b.

The computing nodes 200, 200a, 200b, 200c, and 200d allow a new job of higher importance level to interrupt a job being executed. Therefore, when various kinds of software are specified in successive job requests, the start process should be performed frequently, resulting in deterioration of execution efficiency. For this reason, some rules are set for interruption of a job and change of the state of running software.

Now, five rules for disabling selection of a computing node will be described by way of example. An administrator selects a desired rule to be applied, with taking the reception state of job requests, and sets the selected rule in the node selector 140 in advance.

Figure 12:
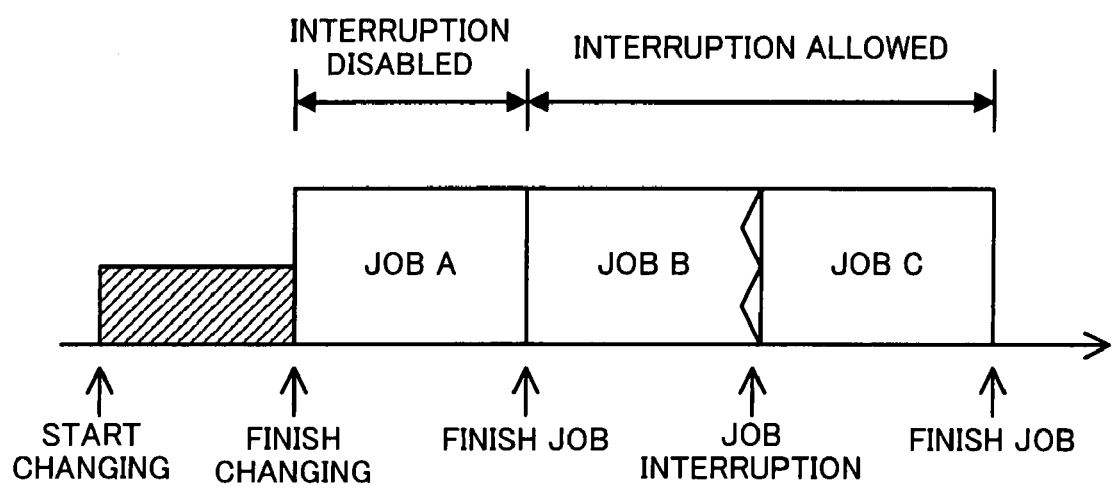
FIGS. 12 to 16 explain the first to fifth rules of disabling selection of a computing node.

FIG. 12 explains the first rule of disabling selection of a computing node.

The first rule is that job interruption is not allowed until a job started immediately after change of the state of running software is finished. For example, a job A of FIG. 12 is a job that is started immediately after change of the state of running software, and therefore another job is not allowed to interrupt the job A until the job A is finished.

On the other hand, a job that did not involve change of the state of running software may be interrupted by another job while being executed. For example, a job B of FIG. 12 is a job that does not involve change of the state of running software, and is therefore interrupted by a job C before the job B is finished.

Under the first rule, a job that involves change of the state of running software can be finished without fail. The first rule can improve the execution efficiency of jobs in such situations that there is a high possibility that interruptions frequently occur because of many job requests and an execution time of each job is not extremely long.

Figure 13:
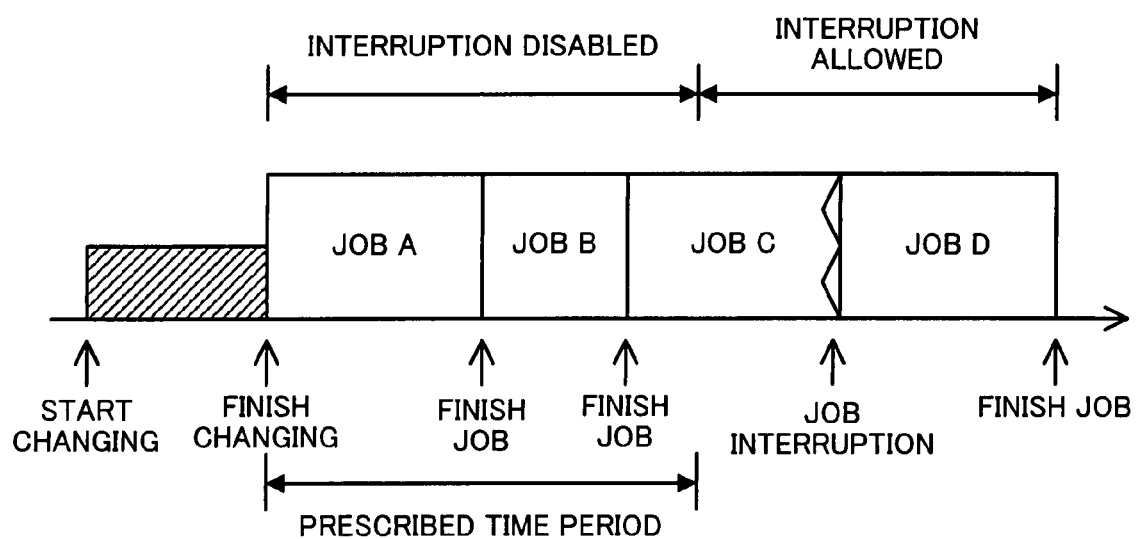

FIG. 13 explains the second rule of disabling selection of a computing node.

The second rule is that job interruption is not allowed for a prescribed time period after completion of change of the state of running software. For example, a job A and job B of FIG. 13 are finished before the prescribed time period elapses after change of the state of running software is finished, and therefore the job A and B are not interrupted.

On the other hand, after the prescribed time period elapsed after the completion of the change of the state of running software, a job is allowed to make an interruption. For example, a job C is a job that is started before the prescribed time period elapses, and is interrupted by a job D because the job C is not finished when the prescribe time period elapses.

As the prescribed time period, an administrator may set a fixed time period, or may set a time period in proportion to a time taken for a start process. Alternatively, the prescribed time period may be determined according to the types of started software. The prescribed time period is set to about three hours, for example.

Under the second rule, a job that involves change of the state of running software can be finished without fail on condition that its execution time is within the prescribed time period. The second rule can further improve the execution efficiency of jobs in such situations that there is a high possibility of interruptions because of many job requests and jobs that require a long execution time and jobs that require a short execution time both exist.

Figure 14:
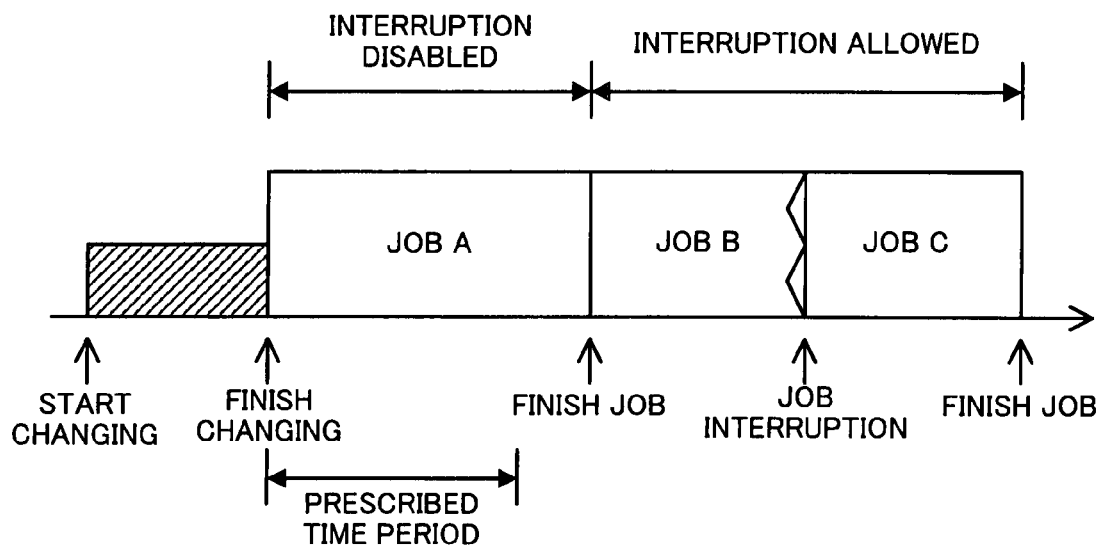

FIG. 14 explains the third rule of disabling selection of a computing node.

The third rule is that job interruption is not allowed until a job started immediately after change of the state of running software is finished and for a prescribed time period after the completion of the change of the state of running software. For example, a job A of FIG. 14 is a job that is started immediately after change of the state of running software and is still being executed when a prescribed time period elapses after the completion of the change of the state of running software, and therefore interruption is not allowed until the job A is finished.

On the other hand, a job that does not involve change of the state of running software and is not finished when the prescribed time period elapses after the completion of the change of the state of running software may be interrupted by another job while being executed. For example, a job B of FIG. 14 is a job that is started following the job A after the elapse of the prescribed time period and therefore is interrupted by a job C.

Similarly to the second rule, as the prescribed time period, an administrator may set a fixed time period, or may set a time period in proportion to a time taken for a start process. Alternatively, the prescribed time period may be determined according to the types of started software.

Under the third rule, a job that involves change of the state of running software can be finished without fail. In addition, in the case where a job involving change of the state of running software requires a short execution time, another job may also be finished before the prescribed time period elapses. The third rule can further improve the execution efficiency of jobs in such situations that there is a high possibility of interruptions because of many job requests and there are big variations in execution time.

Figure 15:
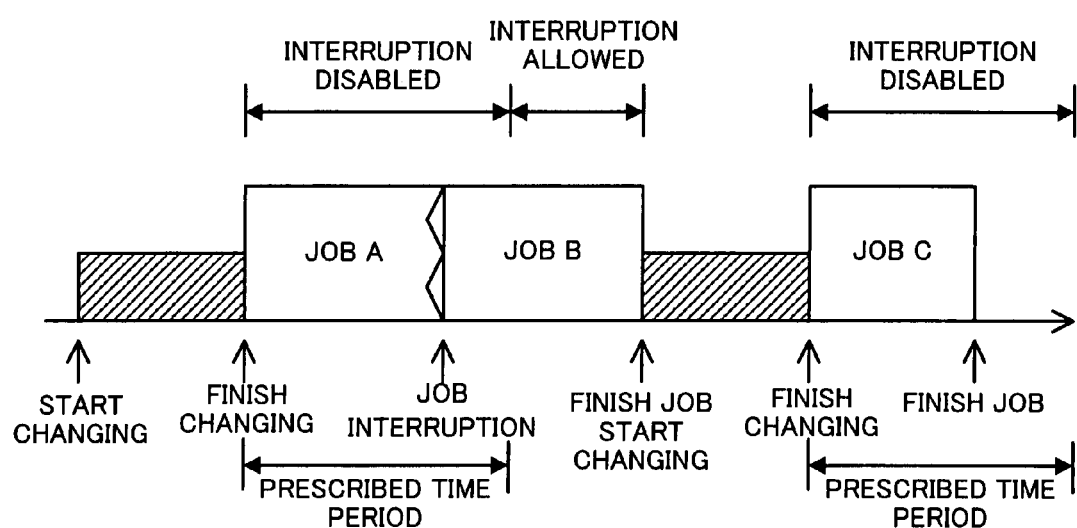

FIG. 15 explains the fourth rule of disabling selection of a computing node.

The fourth rule is that a job that involves change of the state of running software is not allowed to be started for a prescribed time period after completion of change of the state of running software. However, a job that does not involve change of the state of running software is allowed to make an interruption. For example, a job B of FIG. 15 is a job that does not involve change of the state of running software, and therefore the job B interrupts a job A even before the prescribed time period elapses after completion of the change of the state of running software. If a job B involves change of the state of running software, such interruption is not allowed.

On the other hand, a start process can be performed after the prescribed time period elapses after the completion of the change of the state of running software. For example, a job C of FIG. 15 is a job that is started after the prescribed time period elapsed, and the start process is performed for the job C.

Similarly to the second rule, as the prescribed time period, an administrator may set a fixed time period, or may set a time period in proportion to a time taken for a start process. Alternatively, the prescribed time period may be determined according to the types of started software.

The fourth rule can directly prevent the substantial use efficiency of computing nodes from deteriorating due to frequent start processes. The fourth rule can further improve the execution efficiency of jobs in such situations that there is a low possibility of interruptions because of relatively few job requests and an execution time of each job is relatively short.

Figure 16:
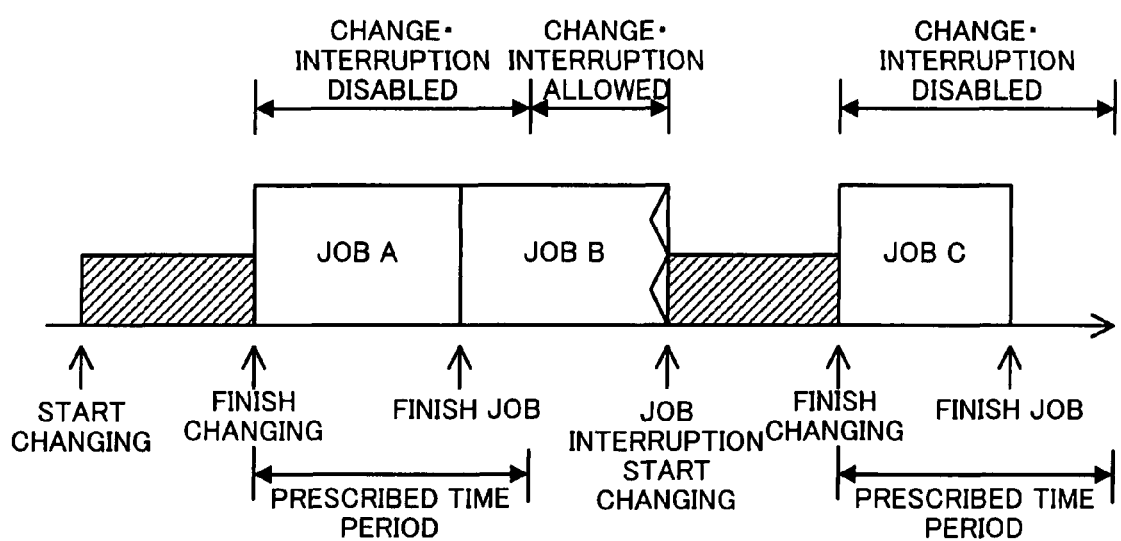

FIG. 16 explains the fifth rule of disabling selection of a computing node.

The fifth rule is that a job start that involves change of the state of running software and job interruption are both not allowed for a prescribed time period after completion of change of the state of running software. For example, a job A of FIG. 16 is finished by the time when the prescribed time period elapses after completion of change of the state of running software, and therefore is not interrupted by another job. In addition, a job B is a job that does not involve change of the state of running software, so that the job B is started after the job A is finished.

On the other hand, a start process and job interruption may be performed after the prescribed time period elapses after the completion of the change of the state of running software. For example, a job C of FIG. 16 is a job that is started after the elapse of the prescribed time period and interrupted the job B.

Similarly to the second rule, as the prescribed time period, an administrator may set a fixed time period, or may set a time period in proportion to a time taken for a start process. Alternatively, the prescribed time period may be determined according to the types of started software.

The fifth rule can directly prevent the substantial use efficiency of computing nodes from deteriorating due to frequent start processes. In addition, the fifth rule can directly prevent the execution efficiency of jobs from deteriorating due to frequent interruptions. The fifth rule can further improve the execution efficiency of jobs in such situations that there is a high possibility of interruptions because of many job requests and an execution time of each job is relatively short.

With such a distributed processing system, a time required for changing the state of running software is reduced and the execution efficiency of jobs can be improved. In addition, the substantial use rate of computing nodes can be further improved. Therefore, this distributed processing system is especially effective in the case where it is used as a sharing system that collectively accepts and deals with a large number of job requests.

It should be noted that the computing nodes 200, 200a, 200b, 200c, and 200d periodically send environment information and job information to the management server 100, but instead, the management server 100 may periodically access the computing nodes 200, 200a, 200b, 200c, and 200d to acquire such information.

Further, in the above embodiment, one computing node can execute only one job simultaneously, but one computing node can be designed to execute a plurality of jobs simultaneously. In this case, computing nodes to be allocated can be selected with taking into consideration not only existence of jobs being executed but also the load of CPU.

The processing functions described above can be realized by a computer. In this case, a program is prepared, which describes processes for the functions to be performed by the management server 100 and the computing nodes 200, 200a, 200b, 200c, and 200d. The program is executed by a computer, whereupon the aforementioned processing functions are accomplished by the computer. The program describing the required processes may be recorded on a computer-readable recording medium. Computer-readable recording media include magnetic recording devices, optical discs, magneto-optical recording media, semiconductor memories, etc. The magnetic recording devices include Hard Disk Drives (HDD), Flexible Disks (FD), magnetic tapes (MT), etc. The optical discs include Digital Versatile Discs (DVD), DVD-Random Access Memories (DVD-RAM), Compact Disc Read-Only Memories (CD-ROM), CD-R (Recordable)/RW (ReWritable), etc. The magneto-optical recording media include Magneto-Optical disks (MO) etc.

To distribute the program, portable recording media, such as DVDs and CD-ROMs, on which the program is recorded may be put on sale. Alternatively, the program may be stored in the storage device of a server computer and may be transferred from the server computer to other computers through a network.

A computer which is to execute the program stores in its storage device the program recorded on a portable recording medium or transferred from the server computer, for example. Then, the computer runs the program. The computer may run the program directly from the portable recording medium. Also, while receiving the program being transferred from the server computer, the computer may sequentially run this program.

According to this invention, environment information indicating running software is continuously acquired from each computing node, environment condition information indicating software necessary for execution of a computing task and the environment information are compared with each other, and a computing node that requires the least software to start with a start process is preferentially selected as a computing node to be allocated to the computing task. This technique can reduce a time required for changing the state of running software and enhance the execution efficiency of computing tasks. In addition, the effective use rate of the computing nodes can be improved.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A non-transitory computer-readable recording medium containing a computer resource management program for assigning and distributing a computing task to a plurality of computing nodes, the computer resource management program causing a computer to execute an operation, the operation comprising: acquiring environment information from the plurality of computing nodes, the environment information indicating running software on each of the plurality of computing nodes; storing the environment information in a node information memory; receiving a computing request including environment condition information specifying necessary software for execution of the computing task; comparing updated environment information of each of the plurality of computing nodes, which is stored in the node information memory, with the environment condition information and preferentially selecting, from among the plurality of computing nodes, a computing node that requires the least start processing of software as a computing node to be allocated when the computing request is received; and controlling the selected computing node to perform the start processing of not-running software if there is the not-running software out of the necessary software specified in the environment condition information and then to execute the computing task according to the computing request.

2. The non-transitory computer-readable recording medium according to claim 1, wherein: the computer continuously acquires task information from the plurality of computing nodes and stores the task information in the node information memory, the task information indicating a computing task being executed on each of the plurality of computing nodes; the computer manages a changed time of when a state of the running software was changed and a start time of when the computing task being executed was started for each of the plurality of computing nodes; and the computer excludes from selectable computing nodes a computing node that is executing a computing task started immediately after an updated changed time.

3. The non-transitory computer-readable recording medium according to claim 1, wherein: the computer continuously acquires task information from the plurality of computing nodes and stores the task information in the node information memory, the task information indicating a computing task being executed on each of the plurality of computing nodes; the computer manages a changed time of when a state of the running software was changed for each of the plurality of computing nodes; and the computer excludes from selectable computing nodes a computing node in which a prescribed time period does not elapse from an updated changed time and the computing task is being executed.

4. The non-transitory computer-readable recording medium according to claim 1, wherein: the computer manages a changed time of when a state of the running software was changed for each of the plurality of computing nodes; and the computer excludes from selectable computing nodes a computing node where a prescribed time period does not elapse from an updated changed time and the start processing is required for executing the computing task according to the computing request.

5. A computing resource management apparatus for assigning and distributing a computing task to a plurality of computing nodes, the computing resource management apparatus comprising: a node information memory storing environment information indicating running software on each of the plurality of computing nodes; a node information acquisition unit to continuously acquire the environment information from the plurality of computing nodes and to store the environment information in the node information memory; a request acceptor to receive a computing request including environment condition information specifying necessary software for execution of the computing task; a node selector to compare updated environment information of each of the plurality of computing nodes, which is stored in the node information memory, with the environment condition information and to preferentially select, from among the plurality of computing nodes, a computing node that requires the least start processing of software as a computing node to be allocated when the request acceptor receives the computing request; and a node controller to control the computing node selected by the node selector to perform the start processing of not-running software if there is the not-running software out of the necessary software specified in the environment condition information and then to execute the computing task according to the computing request.

6. A distributed processing system for assigning and distributing a computing task to a plurality of computing nodes, comprising: the plurality of computing nodes each including: a start file memory storing a start file describing information to be used in a start process of software, a computing unit to start not-running software requested, by using the start file stored in the start file memory in accordance with an instruction of the start process, and to start the computing task requested in accordance with an instruction of the computing task, and a state monitoring unit to continuously monitor the computing unit to collect environment information indicating running software; a business computer including a request issuance unit to issue a computing request at prescribed timing, the computing request including environment condition information specifying necessary software for execution of the computing task; and a management computer including: a node information memory storing the environment information indicating the running software on each of the plurality of computing nodes, a node information acquisition unit to continuously acquire the environment information from the plurality of computing nodes and to store the environment information in the node information memory, a request acceptor to receive the computing request from the business computer, a node selector to compare updated environment information of each of the plurality of computing nodes, which is stored in the node information memory, with the environment condition information and to preferentially select, from among the plurality of computing nodes, a computing node that requires the least start processing of software as a computing node to be allocated when the request acceptor receives the computing request, and a node controller to control the computing node selected by the node selector to perform the start processing of the not-running software if there is the not- running software out of the necessary software specified in the environment condition information and then to execute the computing task according to the computing request.

7. A computing resource management method for assigning and distributing a computing task to a plurality of computing nodes, the computing resource management method comprising:
   acquiring environment information from the plurality of computing nodes, the environment information indicating running software on each of the plurality of computing nodes;
   storing the environment information in a node information memory;
   receiving a computing request including environment condition information specifying necessary software for execution of the computing task;
   comparing updated environment information of each of the plurality of computing nodes, which is stored in the node information memory, with the environment condition information and preferentially selecting, from among the plurality of computing nodes, a computing node that requires the least start processing of software as a computing node to be allocated when the computing request is received; and
   controlling the selected computing node to perform the start processing of not-running software if there is the not-running software out of the necessary software specified in the environment condition information and then to execute the computing task according to the computing request.

* * * * *